US012699919B2

(12) United States Patent
Du et al.

(10) Patent No.: US 12,699,919 B2
(45) Date of Patent: Aug. 4, 2026

(54) METHOD, ELECTRONIC DEVICE, AND COMPUTER PROGRAM PRODUCT FOR MODEL TRAINING AND DURATION PREDICTION

(71) Applicant: EMC IP Holding Company LLC, Hopkinton, MA (US)

(72) Inventors: Fang Du, Guangyuan (CN); Xu Chen, Chengdu (CN); Pan Xiao, Chengdu (CN); Chenxu Han, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1250 days.

(21) Appl. No.: 17/532,129

(22) Filed: Nov. 22, 2021

(65) Prior Publication Data
US 2023/0130801 A1     Apr. 27, 2023

(30) Foreign Application Priority Data
Oct. 22, 2021    (CN) .......................... 202111233552.3

(51) Int. Cl.
*G06N 20/00*          (2019.01)
*G06F 16/11*          (2019.01)
*G06N 5/02*           (2023.01)

(52) U.S. Cl.
CPC ........... *G06N 20/00* (2019.01); *G06F 16/128* (2019.01); *G06N 5/02* (2013.01)

(58) Field of Classification Search
CPC ......... G06N 20/00; G06N 5/02; G06F 16/128
See application file for complete search history.

(56) References Cited

U.S. PATENT DOCUMENTS

| | | | |
|---|---|---|---|
| 2017/0178048 A1 | 6/2017 | Ghotbi et al. | |
| 2019/0342181 A1* | 11/2019 | Li | .......................... H04L 43/16 |
| 2022/0114080 A1* | 4/2022 | Jackson | .............. G06F 9/45558 |

FOREIGN PATENT DOCUMENTS

| | | |
|---|---|---|
| CN | 110034943 A | 7/2019 |
| CN | 111475298 A | 7/2020 |
| CN | 112506429 A | 3/2021 |

OTHER PUBLICATIONS

Li, Jianxin, et al. "Towards an efficient snapshot approach for virtual machines in clouds." Information Sciences 379 (2017): 3-22. (Year: 2017).*

(Continued)

*Primary Examiner* — Kevin W Figueroa
(74) *Attorney, Agent, or Firm* — Ryan, Mason & Lewis, LLP

(57) ABSTRACT

Embodiments of the present disclosure relate to a method, an electronic device, and a computer program product for model training and duration prediction. The method includes acquiring a first set of parameter values related to a first snapshot of a data object, the first snapshot being deleted from a storage system through a first deletion operation. The method further includes acquiring a first duration during which the first deletion operation is performed. The method further includes generating a prediction model based on at least the first set of parameter values and the first duration, the prediction model being used for determining a predicted duration required for deleting the snapshot from the storage system.

19 Claims, 4 Drawing Sheets

(56) References Cited

OTHER PUBLICATIONS

Li, Lianpeng, et al. "SLA-aware and energy-efficient VM consolidation in cloud data centers using robust linear regression prediction model." IEEE Access 7 (2019): 9490-9500. (Year: 2019).*
Wikipedia, "Linear Regression," https://en.wikipedia.org/w/index.php?title=Linear_regression&oldid=1056512491, Nov. 22, 2021, 18 pages.
vmware.com, "Deleting Snapshots," https://docs.vmware.com/en/VMware-vSphere/6.5/com.vmware.vsphere.vm_admin.doc/GUID-06CB6D7D-9ECE-4C53-AA11-C5F2662328CD.html, Jul. 22, 2019, 1 page.

* cited by examiner

200

202

Acquire a first set of parameter values related to a first snapshot of a data object

204

Acquire a first duration during which the first deletion operation is performed

206

Generate a prediction model based on at least the
first set of parameter values and the first duration

300

400

METHOD, ELECTRONIC DEVICE, AND COMPUTER PROGRAM PRODUCT FOR MODEL TRAINING AND DURATION PREDICTION

RELATED APPLICATION(S)

The present application claims priority to Chinese Patent Application No. 202111233552.3, filed Oct. 22, 2021, and entitled "Method, Electronic Device, and Computer Program Product for Model Training and Duration Prediction," which is incorporated by reference herein in its entirety.

FIELD

Embodiments of the present disclosure relate to the field of data storage, and more particularly, to a method, an electronic device, and a computer program product for model training and duration prediction.

BACKGROUND

A storage system refers to a system comprising various storage devices that store programs and data, control components, and devices and algorithms that manage information scheduling. With the development of storage technologies, more and more data are stored into storage systems, leading to more and more uses of the storage systems by users.

When a user uses a storage system, snapshots of various data objects, such as snapshots of virtual machines, file systems, or databases, are usually stored in the storage system to ensure data security. However, there are still many problems that need to be addressed during management of snapshots of data objects in storage systems.

SUMMARY

Embodiments of the present disclosure provide a method, an electronic device, and a computer program product for model training and duration prediction.

In a first aspect of the present disclosure, a method for model training is provided. The method includes acquiring a first set of parameter values related to a first snapshot of a data object, the first snapshot being deleted from a storage system through a first deletion operation. The method further includes acquiring a first duration during which the first deletion operation is performed. The method further includes generating a prediction model based on at least the first set of parameter values and the first duration, the prediction model being used for determining a predicted duration required for deleting the snapshot from the storage system.

According to a second aspect of the present disclosure, a method for duration prediction is provided. The method includes receiving a request for deleting a target snapshot of a data object in a storage system, the request including an identification of the target snapshot. The method further includes acquiring a set of parameter values related to the target snapshot based on the identification. The method further includes determining, based on the set of parameter values, a duration required for deleting the target snapshot.

According to a third aspect of the present disclosure, an electronic device is provided. The electronic device includes at least one processor; and a memory coupled to the at least one processor and having instructions stored thereon, wherein the instructions, when executed by the at least one processor, cause the device to perform actions including: acquiring a first set of parameter values related to a first snapshot of a data object, the first snapshot being deleted from a storage system through a first deletion operation; acquiring a first duration during which the first deletion operation is performed; and generating a prediction model based on at least the first set of parameter values and the first duration, the prediction model being used for determining a predicted duration required for deleting the snapshot from the storage system.

According to a fourth aspect of the present disclosure, an electronic device is provided. The electronic device includes at least one processor; and a memory coupled to the at least one processor and having instructions stored thereon, wherein the instructions, when executed by the at least one processor, cause the device to perform actions including: receiving a request for deleting a target snapshot of a data object in a storage system, the request including an identification of the target snapshot; acquiring a set of parameter values related to the target snapshot based on the identification; and determining, based on the set of parameter values, a duration required for deleting the target snapshot.

According to a fifth aspect of the present disclosure, a computer program product is provided, which is tangibly stored on a non-volatile computer-readable medium and includes machine-executable instructions, wherein the machine-executable instructions, when executed by a machine, cause the machine to perform the steps of the method in the first aspect of the present disclosure.

According to a sixth aspect of the present disclosure, a computer program product is provided, which is tangibly stored on a non-volatile computer-readable medium and includes machine-executable instructions, wherein the machine-executable instructions, when executed by a machine, cause the machine to perform the steps of the method in the second aspect of the present disclosure.

BRIEF DESCRIPTION OF THE DRAWINGS

The above and other objectives, features, and advantages of the present disclosure will become more apparent from the description herein of example embodiments of the present disclosure, with reference to the accompanying drawings. In the example embodiments of the present disclosure, the same reference numerals generally represent the same elements.

Identical or corresponding numerals represent identical or corresponding parts in various accompanying drawings.

DETAILED DESCRIPTION

Figure 1:
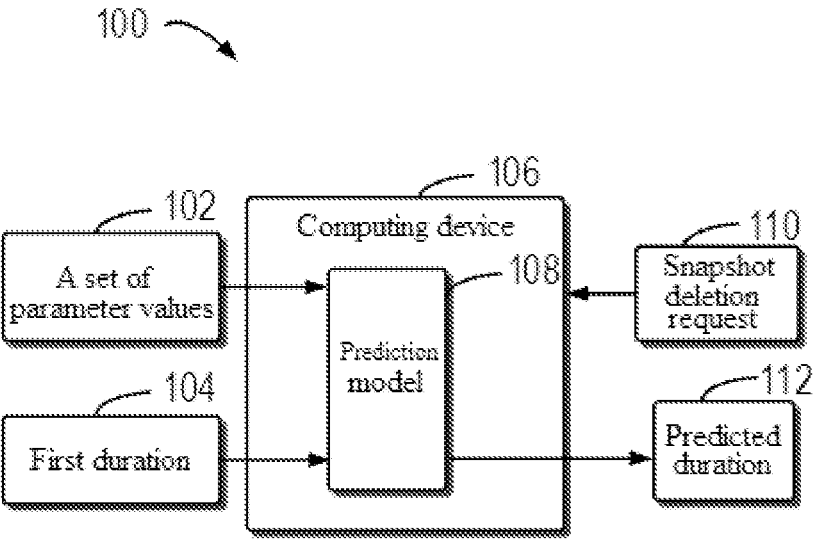
FIG. 1 shows a schematic diagram of an example environment in which a device and/or a method according to embodiments of the present disclosure can be implemented.

The following will describe illustrative embodiments of the present disclosure in more detail with reference to the accompanying drawings. Although the drawings show certain embodiments of the present disclosure, it should be understood that the present disclosure can be implemented in various forms and should not be limited by the embodiments described herein. Instead, these embodiments are provided to enable a more thorough and complete understanding of the present disclosure. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

The principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not in any way limit the scope of the present disclosure.

In current storage systems, users usually store many snapshots of data objects. For snapshots that are no longer used in the storage systems, users usually perform snapshot deletion operations. In order to improve disk reorganization of a storage space, many methods have been proposed to improve the performance of snapshot deletion. However, when there are many snapshots that need to be deleted, the system performance will be affected. For example, storage pools cannot release storage space in a timely manner, storage systems cannot perform upgrades, and storage system resources are continuously consumed.

If users are not aware of these problems when deleting snapshots, they may continue to perform snapshot creation and deletion operations, so that these operations will be unable to complete in time and require a long wait time, resulting in a very poor user experience. At the same time, this will also deteriorate the performance of the system.

In order to at least address the above and other potential problems, illustrative embodiments of the present disclosure provide a method for model training. In the method, a computing device acquires a first set of parameter values related to a first snapshot of a data object, the first snapshot being deleted from a storage system through a first deletion operation. The computing device further acquires a first duration during which the first deletion operation is performed. The computing device then generates a prediction model based on at least the first set of parameter values and the first duration, the prediction model being used for determining a predicted duration required for deleting the snapshot from the storage system. By means of the method, a user can know the amount of time required for deleting the snapshot, which improves the user experience and is beneficial to improving the system performance.

Illustrative embodiments of the present disclosure will be further described in detail with reference to the accompanying drawings below. FIG. 1 shows a schematic diagram of example environment 100 in which embodiments of the present disclosure can be implemented.

Example environment 100 includes computing device 106. Computing device 106 is used for managing deletion of a snapshot in a storage system and predicting a duration required for deleting the snapshot.

Computing device 106 includes, but is not limited to, a personal computer, a server computer, a handheld or laptop device, a mobile device (such as a mobile phone, a personal digital assistant (PDA), and a media player), a multiprocessor system, a consumer electronic product, a minicomputer, a mainframe computer, a distributed computing environment including any of the above systems or devices, and the like.

Computing device 106 may be used for training prediction model 108 for predicting a duration of deleting a snapshot. During training, the computing device may acquire a set of parameter values 102 of a deleted first snapshot and first duration 104 of deleting the first snapshot. In addition, computing device 106 may also acquire parameter values of many other deleted snapshots and durations of deletion operations. Then, computing device 106 trains the prediction model by using the parameter values of these snapshots and the corresponding durations, and the trained prediction model may be used for predicting a duration of deleting a snapshot.

In some embodiments, a set of parameter values for each snapshot used for training the prediction model may include at least one of central processing unit (CPU) usage, the number of snapshots being deleted when the snapshot is deleted, a storage duration of the snapshot, and a size of the data object when the snapshot is created. The above examples are only used to describe the present disclosure, and those skilled in the art can set, according to needs, values corresponding to additional or alternative parameters included in a set of parameter values and the number of parameters.

In some embodiments, after computing device 106 has trained prediction model 108, the prediction model may be verified by using data of other deleted snapshots. If it is verified that the prediction model meets requirements, the prediction model may be determined as available; and if the requirements are not met, the prediction model continues to be trained.

In some embodiments, the prediction model is a linear regression model, such as a multiple linear regression model. In some embodiments, the prediction model is a neural network model. The above examples are intended to describe the present disclosure only and are not specific limitations to the present disclosure. Those skilled in the art may set the prediction model to be any suitable machine learning model as required.

After the prediction model is trained, when receiving snapshot deletion request 110, computing device 106 will acquire a set of parameter values corresponding to a snapshot according to an identification of the snapshot in snapshot deletion request 110, then input the set of parameter values into prediction model 108, and determine predicted duration 112 for deleting the snapshot.

FIG. 1 shows that training and use of prediction model 108 are both performed in computing device 106. However, this arrangement is only an example and not a specific limitation to the present disclosure. The training and use of prediction model 108 may be performed in different computing devices.

By means of the method, the user can know the amount of time required for deleting the snapshot, which improves the user experience and is beneficial to improving the system performance.

Figure 2:
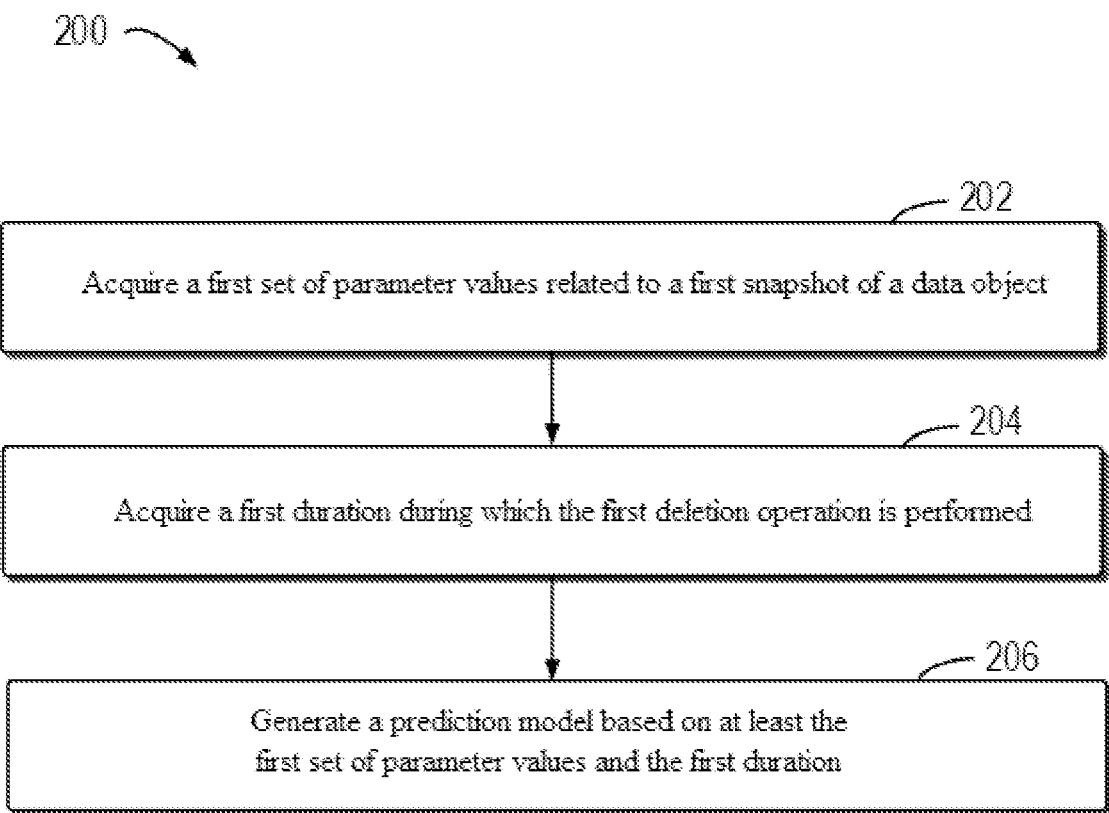
FIG. 2 shows a flowchart of a method for model training according to an embodiment of the present disclosure.

A block diagram of example environment 100 in which embodiments of the present disclosure can be implemented is described with reference to FIG. 1. FIG. 2 shows a flowchart of method 200 for model training according to an embodiment of the present disclosure. Method 200 may be performed at computing device 106 in FIG. 1 and any suitable computing device.

At block 202, computing device 106 acquires a first set of parameter values related to a first snapshot of a data object, the first snapshot being deleted from a storage system through a first deletion operation.

In some embodiments, the first set of parameter values includes at least one of the following: CPU usage, the number of snapshots being deleted when the first snapshot is deleted, a storage duration of the first snapshot, and a size of the data object when the first snapshot is created. The above is only an example, rather than a specific limitation to the present disclosure. Those skilled in the art may set the set of parameter values to include any suitable parameter values as needed. In this way, values of parameters related to the deletion operation of the snapshot may be quickly obtained.

At block 204, computing device 106 acquires a first duration during which the first deletion operation is performed. In addition to acquiring parameter information related to the snapshot, computing device 106 further needs to acquire the duration of deleting the snapshot.

At block 206, computing device 106 generates a prediction model based on at least the first set of parameter values and the first duration, the prediction model being used for determining a predicted duration required for deleting the snapshot from the storage system.

In some embodiments, computing device 106 not only needs a set of parameter values and the first duration corresponding to the first snapshot, but also needs to train the prediction model by using parameter values of other snapshots and corresponding durations of deletion operations.

Figure 3:
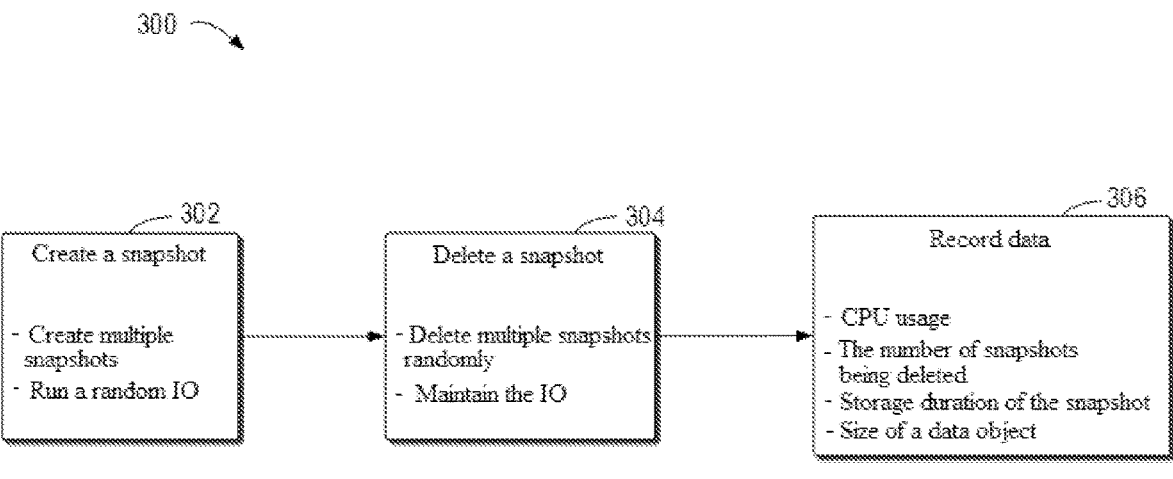
FIG. 3 shows a flowchart of a method for acquiring parameters of a snapshot according to an embodiment of the present disclosure.

In some embodiments, computing device 106 may train the prediction model by using parameter values of snapshots recorded during actual use of the storage system and duration data of snapshot deletion operations. In some embodiments, computing device 106 may manually create some snapshots in the storage system and delete some of the snapshots to generate data for training the prediction model. FIG. 3 shows a schematic diagram of example 300 for acquiring parameters of a snapshot according to an embodiment of the present disclosure.

As shown in FIG. 3, at block 302, the user creates a snapshot in the storage system. In this step, not only are many snapshots created, but also random IO operations are performed on the storage system. Then, at block 304, a snapshot deletion operation is performed. The snapshot deletion operation is performed randomly, and at the same time, the IO operation is maintained. Then, data related to the deleted snapshot is recorded at block 306, such as the parameter values for the snapshot, including the CPU usage when the snapshot is deleted, the number of snapshots being deleted, a storage duration of the snapshot, and a size of a data object when the snapshot is generated. In addition, a duration of the deletion operation is also recorded. Then, the prediction model is trained by using the data.

Now returning to FIG. 2, in some embodiments, the prediction model generated in block 206 is a linear regression model, such as a multiple linear regression model. At this time, the linear regression model is trained by using the first set of parameter values and the first duration to obtain parameters of the prediction model. In the process, parameter values and corresponding durations of other snapshots may also be applied. For example, a linear regression model with four variables is taken as an example:

$$y = w_0 + w_1 x_1 + w_2 x_2 + w_3 x_3 + w_4 x_4$$

where y represents the duration of snapshot deletion, $x_1$ represents the CPU usage of the storage system when the snapshot is deleted, $x_2$ represents the number of snapshots being deleted when the snapshot is deleted, $x_3$ represents the storage duration of the snapshot, and $x_4$ represents the size of the data object when the snapshot is created, and $w_0$, $w_1$, $w_2$, $w_3$, and $w_4$ represent weight parameters. Values of weight parameters $w_0$, $w_1$, $w_2$, $w_3$, and $w_4$ are determined by inputting the above parameter values and corresponding durations of multiple snapshots into the linear regression model.

Alternatively, computing device 106 also uses data of another set of deleted snapshots to verify whether the prediction model is available.

In some embodiments, computing device 106 acquires a second set of parameter values related to a second snapshot of the data object, the second snapshot being deleted from the storage system through a second deletion operation. The second snapshot is a snapshot in another set of deleted snapshots used for verifying the prediction model. Computing device 106 will further acquire a second duration during which the second deletion operation is performed. Then, computing device 106 applies the second set of parameter values to the trained linear regression model to determine a predicted duration of the second deletion operation. Computing device 106 may further acquire a predicted duration and an actual duration of a deletion operation of another snapshot in the other set of deleted snapshots for verification. Then, by using the predicted duration for the second snapshot and the predicted duration of another snapshot in combination with the second duration and another actual duration, the availability of the trained linear regression model is determined. In this way, the accuracy of the prediction model can be ensured.

In some embodiments, when determining the availability of the trained linear regression model, computing device 106 first determines a fitting degree for the trained linear regression model based on the predicted duration and the second duration. A calculation process of the fitting degree is also implemented by using the predicted duration and actual duration of the deletion operation of another snapshot in another set of deleted snapshots. For example, the fitting degree $R^2$ is calculated by using the following formula:

$$\begin{cases} R^2 = 1 - \dfrac{\sum (y_i - f_i)^2}{\sum (y_i - \bar{y})^2} \\ \bar{y} = \dfrac{1}{n} \sum_{k=1}^{n} y_i \end{cases}$$

where $y_i$ represents a true value of a duration during which the used i-th snapshot is deleted, $f_i$ represents a predicted value of the duration during which the used i-th snapshot is deleted, n represents the number of used snapshots in the evaluation, and $\Sigma$ represents a summation function.

If it is determined that the fitting degree is equal to or higher than a threshold degree, the trained linear regression model is determined as an available prediction model. If it is determined that the fitting degree is less than the threshold degree, the linear regression model continues to be trained by using the parameter values of the deleted snapshot and the durations of the corresponding deletion operations. The magnitude of the threshold degree may be set by those skilled in the art as required.

In some embodiments, the prediction model is a neural network model, and the acquired parameter values of multiple snapshots including the first snapshot and multiple durations of the corresponding deletion operations are input into the neural network model to generate the prediction model.

By means of the method, the user can know the amount of time required for deleting the snapshot, which improves the user experience and is beneficial to improving the system performance.

Figure 4:
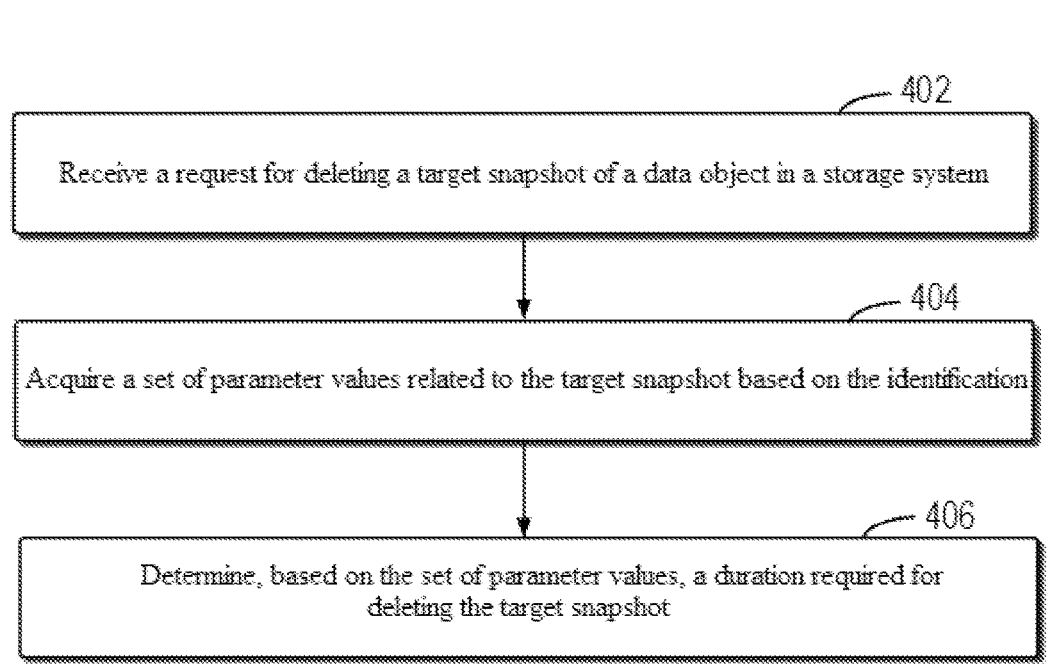
FIG. 4 shows a flowchart of a method for determining a duration of a deletion operation of a snapshot according to an embodiment of the present disclosure.

The block diagram of method 200 for model prediction according to embodiments of the present disclosure is described above with reference to FIG. 2 and FIG. 3. A flowchart of method 400 for determining a duration of a deletion operation of a snapshot according to an embodiment of the present disclosure will be described below with reference to FIG. 4. Method 400 may be performed at computing device 106 in FIG. 1 or any suitable computing device.

At block 402, computing device 106 receives a request for deleting a target snapshot of a data object in a storage system. The request includes an identification of the target snapshot. For example, computing device 106 receives snapshot deletion request 110 that includes an identification of a snapshot to be deleted.

At block 404, computing device 106 acquires a set of parameter values related to the target snapshot based on the identification. In some embodiments, for the target snapshot, the corresponding set of parameter values includes at least one of the following: CPU usage, the number of snapshots being deleted when the target snapshot is deleted, a storage duration of target snapshot, and a size of the data object when the target snapshot is created. The above is only an example, rather than a specific limitation to the present disclosure. Those skilled in the art can select appropriate parameter values according to requirements of a model.

At block 406, computing device 106 determines a duration required for deleting the target snapshot based on the set of parameter values.

In some embodiments, the computing device applies the set of parameter values to the prediction model trained using the method shown in FIG. 2 to predict a duration. For example, prediction model 108 is used for generating a predicted duration.

In some embodiments, there may be a mapping table between parameter values and predicted durations, and computing device 106 looks up the mapping table for the corresponding predicted durations based on the set of parameter values. The above examples are intended to describe the present disclosure only and are not specific limitations to the present disclosure.

Through this method, the user can know the amount of time required for deleting the snapshot, which improves the user experience and is beneficial to improving the system performance.

Figure 5:
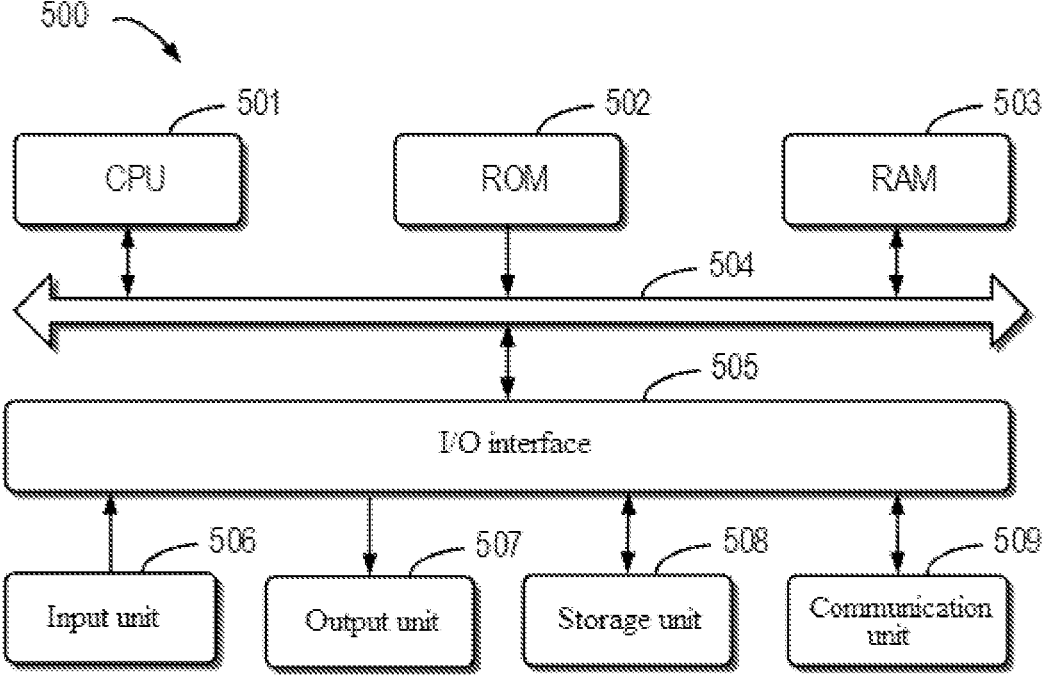
FIG. 5 shows a schematic block diagram of an example device suitable for implementing embodiments of the present disclosure.

FIG. 5 shows a schematic block diagram of example device 500 that can be used to implement embodiments of the present disclosure. Computing device 106 in FIG. 1 can be implemented using device 500. As shown in the figure, device 500 includes CPU 501, which may execute various appropriate actions and processing in accordance with computer program instructions stored in read-only memory (ROM) 502 or computer program instructions loaded from storage unit 508 onto random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage page 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods and processes described above, such as methods 200 and 400, may be performed by CPU 501. For example, in some embodiments, methods 200 and 400 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more actions of methods 200 and 400 described above may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or the block diagrams and combinations of blocks in the flowcharts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method, comprising:
   acquiring a first set of parameter values related to a first snapshot of a data object, the first snapshot being deleted from a storage system through a first deletion operation;
   acquiring a first duration during which the first deletion operation is performed;
   generating a prediction model based on at least the first set of parameter values and the first duration, the prediction model being used for determining a predicted duration required for deleting each of one or more additional snapshots from the storage system, wherein the first set of parameter values comprises at least a number of snapshots being deleted when the first snapshot is deleted and a size of the data object when the first snapshot is created, and wherein the prediction model comprises a multiple-input machine learning model comprising at least a first input configured to receive a snapshot number parameter value comprising a number of snapshots being deleted when a given one of the additional snapshots is deleted and a second input configured to receive a data object size parameter value comprising a size of the data object when the given additional snapshot is created, the multiple-input machine learning model being configured to generate, at an output thereof, the predicted duration as a weighted function of at least the snapshot number parameter value and the data object size parameter value, utilizing weight parameters that are determined at least in part in conjunction with training of the multiple-input machine learning model; and controlling deletion of the one or more additional snapshots from the storage system based on one or more respective predicted durations generated by the prediction model for one or more additional sets of parameter values.

2. The method according to claim 1, wherein the first set of parameter values further comprises at least one of the following: central processing unit (CPU) usage, and a storage duration of the first snapshot.

3. The method according to claim 1, wherein generating the prediction model comprises:

obtaining parameters of the prediction model by training a linear regression model using the first set of parameter values and the first duration.

4. The method according to claim 3, further comprising:

acquiring a second set of parameter values related to a second snapshot of the data object, the second snapshot being deleted from the storage system through a second deletion operation;

acquiring a second duration during which the second deletion operation is performed;

applying the second set of parameter values to the trained linear regression model to determine a predicted duration for the second deletion operation; and determining the availability of the trained linear regression model based on the predicted duration and the second duration.

5. The method according to claim 4, wherein determining the availability of the trained linear regression model comprises:

determining a fitting degree for the trained linear regression model based on the predicted duration and the second duration; and if it is determined that the fitting degree is equal to or higher than a threshold degree, determining the trained linear regression model as an available prediction model.

6. The method according to claim 5, further comprising:

if it is determined that the fitting degree is less than the threshold degree, continuing training the linear regression model by using parameter values of the deleted snapshot and a duration of the corresponding deletion operation.

7. A computer program product comprising a non-volatile computer-readable medium storing machine-executable instructions, wherein the machine-executable instructions, when executed by a machine, cause the machine to perform steps of the method according to claim 1.

8. A method, comprising:

receiving a request for deleting a target snapshot of a data object in a storage system, the request comprising an identification of the target snapshot;

acquiring a set of parameter values related to the target snapshot based on the identification;

determining, based on the set of parameter values, a duration required for deleting the target snapshot, wherein the set of parameter values comprises at least a number of snapshots being deleted when the target snapshot is deleted and a size of the data object when the target snapshot is created; and controlling deletion of the target snapshot from the storage system based on the determined duration;

wherein determining a duration required for deleting the target snapshot comprises determining the duration by applying the set of parameter values to a prediction model, and wherein the prediction model comprises a multiple-input machine learning model comprising at least a first input configured to receive a snapshot number parameter value comprising the number of snapshots being deleted when the target snapshot is deleted and a second input configured to receive a data object size parameter value comprising the size of the data object when the target snapshot is created, the multiple-input machine learning model being configured to generate, at an output thereof, the duration as a weighted function of at least the snapshot number parameter value and the data object size parameter value, utilizing weight parameters that are determined at least in part in conjunction with training of the multiple-input machine learning model.

9. The method according to claim 8, wherein the set of parameter values further comprises at least one of the following: central processing unit (CPU) usage, and a storage duration of the target snapshot.

10. A computer program product comprising a non-volatile computer-readable medium storing machine-executable instructions, wherein the machine-executable instructions, when executed by a machine, cause the machine to perform steps of the method according to claim 8.

11. An electronic device, comprising:

at least one processor; and memory coupled to the at least one processor and having instructions stored thereon, wherein the instructions, when executed by the at least one processor, cause the electronic device to perform actions including:

acquiring a first set of parameter values related to a first snapshot of a data object, the first snapshot being deleted from a storage system through a first deletion operation;

acquiring a first duration during which the first deletion operation is performed;

generating a prediction model based on at least the first set of parameter values and the first duration, the prediction model being used for determining a predicted duration required for deleting each of one or more additional snapshots from the storage system, wherein the first set of parameter values comprises at least a number of snapshots being deleted when the first snapshot is deleted and a size of the data object when the first snapshot is created, and wherein the prediction model comprises a multiple-input machine learning model comprising at least a first input configured to receive a snapshot number parameter value comprising a number of snapshots being deleted when a given one of the additional snapshots is deleted and a second input configured to receive a data object size parameter value comprising a size of the data object when the given additional snapshot is created, the multiple-input machine learning model being configured to generate, at an output thereof, the predicted duration as a weighted function of at least the snapshot number parameter value and the data object size parameter value, utilizing weight parameters that are determined at least in part in conjunction with training of the multiple-input machine learning model; and controlling deletion of the one or more additional snapshots from the storage system based on one or more respective predicted durations generated by the prediction model for one or more additional sets of parameter values.

12. The electronic device according to claim 11, wherein the first set of parameter values further comprises at least one of the following: central processing unit (CPU) usage, and a storage duration of the first snapshot.

13. The electronic device according to claim 11, wherein generating the prediction model comprises:

obtaining parameters of the prediction model by training a linear regression model using the first set of parameter values and the first duration.

14. The electronic device according to claim 13, wherein the actions further comprise:

acquiring a second set of parameter values related to a second snapshot of the data object, the second snapshot being deleted from the storage system through a second deletion operation;

acquiring a second duration during which the second deletion operation is performed;

applying the second set of parameter values to the trained linear regression model to determine a predicted duration for the second deletion operation; and determining the availability of the trained linear regression model based on the predicted duration and the second duration.

15. The electronic device according to claim 14, wherein determining the availability of the trained linear regression model comprises:

determining a fitting degree for the trained linear regression model based on the predicted duration and the second duration; and if it is determined that the fitting degree is equal to or higher than a threshold degree, determining the trained linear regression model as an available prediction model.

16. The electronic device according to claim 15, wherein the actions further comprise:

if it is determined that the fitting degree is less than the threshold degree, continuing training the linear regression model by using parameter values of the deleted snapshot and a duration of the corresponding deletion operation.

17. The electronic device according to claim 11, wherein the instructions, when executed by the at least one processor, further cause the electronic device to perform actions including:

receiving a request for deleting a target snapshot of a data object in the storage system, the request comprising an identification of the target snapshot;

acquiring a target set of parameter values related to the target snapshot based on the identification; and determining, based on the target set of parameter values, a duration required for deleting the target snapshot.

18. The electronic device according to claim 17, wherein determining a duration required for deleting the target snapshot comprises:

determining the duration by applying the target set of parameter values to the prediction model.

19. The electronic device according to claim 17, wherein the target set of parameter values comprises at least one of the following: central processing unit (CPU) usage, the number of snapshots being deleted when the target snapshot is deleted, a storage duration of the target snapshot, and a size of the data object when the target snapshot is created.

\* \* \* \* \*